United States Patent [19]
Walters

[11] 3,728,528
[45] Apr. 17, 1973

[54] CIRCULAR INTERPOLATION BY FINITE DIFFERENCES

[75] Inventor: Ronnie G. Walters, Mayfield Heights

[73] Assignee: Allen-Bradley Company, Milwaukee, Wis.

[22] Filed: Mar. 24, 1971

[21] Appl. No.: 127,657

[52] U.S. Cl............................235/152, 235/151.11
[51] Int. Cl................................................G06f 7/38
[58] Field of Search....................235/152, 151.11, 235/197

[56] References Cited

UNITED STATES PATENTS 3,325,630  6/1967  Hisato Murakami........235/151.11 X
3,524,049  8/1970  Gotz................................235/152 X
3,555,253  1/1971  Seki.............................235/151.11

OTHER PUBLICATIONS

Per E. Damielsson, "Incremental Curve Generation" IEEE Trans. on Computers Vol. C19 No. 9 September 1970 pp 783–793

Primary Examiner—Malcolm A. Morrison
Assistant Examiner—David H. Malzahn
Attorney—Lindenberg, Freilich & Wasserman

[57] ABSTRACT

A sine cosine generator is described which can iteratively rotate an initial condition vector at a predetermined rate thus producing points which lie on a circle whose radius is determined by the initial condition vector.

8 Claims, 3 Drawing Figures

Fig. 1

INVENTOR
RONNIE G. WALTERS
BY Lindenberg, Freilich & Wasserman
ATTORNEYS

CIRCULAR INTERPOLATION BY FINITE DIFFERENCES

BACKGROUND OF THE INVENTION

This invention relates to a sine - cosine generator system and more particularly to such a system particularly adapted for generating signals for directing a numerically controlled machine tool to describe a circle.

It is well known that solutions to the differential equations of a circle may be generated by finite difference approximations of an integral. This leads to one technique known as the "serial difference" method which is an implementation of the following difference equation (derived by Euler integration).

(1) $\begin{pmatrix} X_{i+1} \\ Y_{i+1} \end{pmatrix} = \begin{bmatrix} 1 & \phi \\ -\phi & 1-\phi^2 \end{bmatrix} \begin{pmatrix} X_i \\ Y_i \end{pmatrix} \begin{pmatrix} X_0 \\ Y_0 \end{pmatrix} = $ Initial Condition where $(x_i)$ and $(y_i)$ are the elements of the vector describing "position" at the time $(i)$ denoted by the subscript. The constant $(\phi)$ determines the angular velocity and for $(\phi << 1)$ is approximately equal to radians of rotation per iteration. When $(\phi)$ is a power of two these equations are easily implemented by a serial digital differential analyzer, (D.D.A.) It can be shown that this technique produces dynamic errors (truncation error) which cause the system to produce an approximately elliptical function whose worst case distance from the desired radius, as defined by the initial condition, is 2. $\| \epsilon \| \cong \frac{1}{2} \phi R_o$ where $(\epsilon)$ is the maximum error and $(R_o)$ is the initial radius.

Another well known method of sine cosine generation known as the parallel difference technique results in a similar set of difference equations given by (3) $\begin{pmatrix} X_{i+1} \\ Y_{i+1} \end{pmatrix} = \begin{bmatrix} 1 & \phi \\ -\phi & 1 \end{bmatrix} \begin{pmatrix} X_i \\ Y_i \end{pmatrix} \begin{pmatrix} X_0 \\ Y_0 \end{pmatrix} = $ Initial Condition where the definitions of the variables are the same as above. Again, if $(\phi)$ is a power of two, these equations are easily implemented by a serial D.D.A. The parallel difference exhibits a somewhat different error characteristic in that the radius increases exponentially from the initial radius $(R_o)$. This is because the eigenvalues of the characteristic matrix are of greater than unit magnitude. It can be shown that for small $(\phi)$ the radius increases by approximately $(\Delta e)$ each iteration, where 4. $\Delta e = \frac{1}{2} \phi^2 R_o$ and the cumulative error is 5. $e = \frac{1}{2} \phi^2 R_o (t/\Delta t)$ where $(t/\Delta t)$ is the total number of iterations. From the definition of $(\phi)$, it is seen that after one radian of rotation, the error produced by the parallel method begins to exceed the maximum error produced by the serial difference method. This, of course, assumes that $(\phi)$ is the same in both techniques.

It is apparent in both of these techniques that a reduction in $(\phi)$ leads to a reduction in error. In a real time application such as interpolation for a machine tool or drafting machine, we have $(\Delta t)$ as the period between iterations. Using this definition, angular velocity may be defined as 6. $\omega = $ RADIANS/SEC. $\cong \phi/\Delta t$ In a real time application $(\omega)$ is generally the independent variable and thus we have for the errors produced by the serial and parallel systems 7. serial error$_{(max)} = \frac{1}{2} \omega \Delta t R_o$ 8. parallel error $= \frac{1}{2} \omega \Delta t R_o$
(after one radian)

Therefore, if $(\omega)$ is specified, the only way in which accuracy may be increased is to reduce $(\Delta t)$. In many applications, the required iteration rate $(1/\Delta t)$ would become prohibitively high. An object of the proposed system is to reduce the required iteration rate for a given angular velocity and accuracy requirement. Furthermore, this is to be done with an absolute minimum of additional complexity in the system.

OBJECTS AND SUMMARY OF THE INVENTION

An object of this invention is to provide a method and means for the rotation of an initial condition vector at a predetermined rate and direction. (sign of rate)

Another object of this invention is the provision of a method and means of the type indicated, which enables a reduction in the required iteration rate for obtaining a given accuracy and angular velocity requirement.

Still another object of the invention is the provision of a method and means for effectuating circular interpolation in a machine tool control system which is more accurate than systems used previously.

Yet another object of the present invention is the provision of a novel and useful circular interpolation system.

These and other objects of the invention are achieved by providing a method and means for solving the equations.

$$X_{i+1} = X_i - \phi(\tfrac{1}{2}\phi X_i - Y_i)$$

$$Y_{i+1} = Y_i - \phi(\tfrac{1}{2}\phi Y_i + X_i)$$

where
$X_o, Y_o$ are starting points
$X_i, Y_i$ are points reached after a first iteration
$X_{i+1}, Y_{i+1}$ are points reached on next iteration
$\phi$ is radians of rotation per iteration.

The novel features of the invention are set forth with particularity in the appended claims. The invention will best be understood from the following description when read in conjunction with the accompanying drawings.

DESCRIPTION OF THE PREFERRED EMBODIMENTS

In order to aid in understanding the operation of the system, its mathematical structure will be described briefly. For an ideal rotation, it is desirable to implement the following difference equation (9) $\begin{pmatrix} X_{i+1} \\ Y_{i+1} \end{pmatrix} = \begin{bmatrix} \cos \theta & \sin \theta \\ -\sin \theta & \cos \theta \end{bmatrix} \begin{pmatrix} X_i \\ Y_i \end{pmatrix}$ where ($\theta$) is exactly the rotation per iteration. This set of equations, although precise is not practical for a finite difference function generator. The reason for this is that the coefficients contained in the matrix are in general, rational numbers. It can be shown in the error analysis that the precision of the coefficients in this matrix is of the utmost importance in the reduction of dynamic errors.

The development of an accurate system then depends on the use of finite precision coefficients which are as close as possible to the coefficients of equation (9) for some ($\theta$). This is done as follows, let 10. $\phi = \sin \theta$ making the replacement gives (11) $\begin{pmatrix} X_{i+1} \\ Y_{i+1} \end{pmatrix} = \begin{bmatrix} \sqrt{1-\phi^2} & \phi \\ -\phi & \sqrt{1-\phi^2} \end{bmatrix} \begin{pmatrix} X_i \\ Y_i \end{pmatrix}$ This is taken advantage of by letting ($\phi$) be the independent variable and representing it in the system by a finite precision word. This is the equivalent of choosing ($\theta$) actual as close to ($\theta$) desired such that ($\phi$) can be represented exactly by a finite word length. Note that for small ($\phi$), that ($\theta$) and ($\phi$) are approximately equal. This approximation however has no effect on the change of radius with time. Thus, two coefficients of the rotation matrix are represented exactly by finite words. At this point, the radical term is not in a practical form, for even if it were computed exactly it would have to be truncated to some finite precision, therefore, the radical is expanded according to the binomial theorem, yielding, 12. $(1-\phi^2)^{1/2} = 1 - \tfrac{1}{2}\phi^2 - \tfrac{1}{8}\phi^4 - 1/16\phi^6\ 136 - 5/128\phi^8 \ldots$ Note that each term of this expansion can be represented by a finite word length (because ($\phi$) is a finite word). Note also that if all the terms containing ($\phi$) are eliminated, the result is essentially that of the parallel D.D.A. described previously. The great reduction in truncation error of the proposed invention results from the inclusion of one or more of the terms of (12) containing ($\phi$). In addition, it is noted that the first three of these terms have coefficients which are powers of two. If in addition ($\phi$) is a power of two, an extremely accurate serial D.D.A. results by carrying out the following equations, or a portion thereof.

13. $X_{i+1} = X_i - 2^{-(2N+1)}X_i\ 31\ 2^{-(4N+3)}X_i - 2^{-(6N+4)}X_i + 2^{-N}Y_i$ $Y_{i+1} = Y_i - 2^{-(2N+1)}Y_i - 2^{-(4N+3)}Y_i - 2^{-(6N+4)}Y_i - 2\ 116\ NX_i$ where $\phi = 2^{-N}$ in this case, the error after one radian of rotation is 14. $e = 5/128\phi^7 R_o$ In the more general case, a D.D.A. would be constructed with ($\phi$) not a power of two. Having chosen a word length for ($\phi$) say, less than the maximum precision of the system, one or more of the terms of equation 12 can be represented exactly by a word of full system precision. For example, consider a system with 32 bits of precision, and with ($\phi$) represented by 16 bits.

In such a case, the second term of equation 12 can be represented exactly in full system precision (32 bits). In this example, the variables ($x_i$) and ($y_i$) would also be represented in full system precision. This places an ultimate limit on the number of additional terms which can be included. The reason for this is that, depending on the exponent of ($\phi$), a point is reached where additional terms become too small to be added to the first term of equation 12 (unity) in a 32 bit word. Even so, additional terms of equation (12) may be included if the exponent of ($\phi$) is small enough to permit addition within the defined word length, thus, further increasing the accuracies.

Of major importance here is recognition of the fact that very high accuracies may be achieved using a D.D.A. and in addition including one or more of the terms of equation (12) (those containing $\phi$). It should be further recognized that the coefficients of equation (12) are particularly suited to implementation on a binary machine. It is also to be noted that, as shown by equation (13), vast improvement in the accuracy of a system which uses conventional series D.D.A.'s results from the fact that four of the terms from equation 12 can be implemented using a D.D.A. which requires only shifts and adds.

It can be shown that the dynamic errors produced by a system of this (equations 11 and 12) can be approximated by the product of the first term of equation (12) not used and $(-R_o\delta/\phi)$. Where ($\delta$) is the radian rotation from the initial condition.

For example, if only the first term of equation (12) containing ($\phi$) is retained, the error after one radian of rotation is 15. $e = \tfrac{1}{8}\phi^3 R_o$ which is seen to be vastly smaller than the errors produced by the conventional serial or parallel systems for the same value of ($\phi$). To aid comparison consider the substitution of ($\omega$) which gives, after one radian 16. $e = \tfrac{1}{8}\omega^3 \Delta t^3 R_o$ note that in all cases 17. $\phi \cong \omega \Delta t \ll 1$ $(\theta = \omega \Delta t)$ Now if in equations 13 we use $\phi$ instead of $2^{-N}$ and we truncate the equations by omitting all but the first two and last terms we obtain the following difference equations $X_{i+1} = X_i - \phi(\tfrac{1}{2}\phi X_i - Y_i)$ $X_o, Y_o$ GIVEN 18. $Y_{i+1} = Y_i - \phi(\tfrac{1}{2}\phi Y_i + X_i)$ It is seen that these equations may be solved by a conventional D.D.A., except for the inclusion of an additional term. That is, the first term containing ($\phi$) in equation (12) has been included. Accuracy may be further increased by including additional terms of equation (12) in a similar fashion, however, in order to simplify explanation only one term is included: These are the equations to be solved by the preferred embodiment of the invention shown in FIG. 1.

Figure 1:
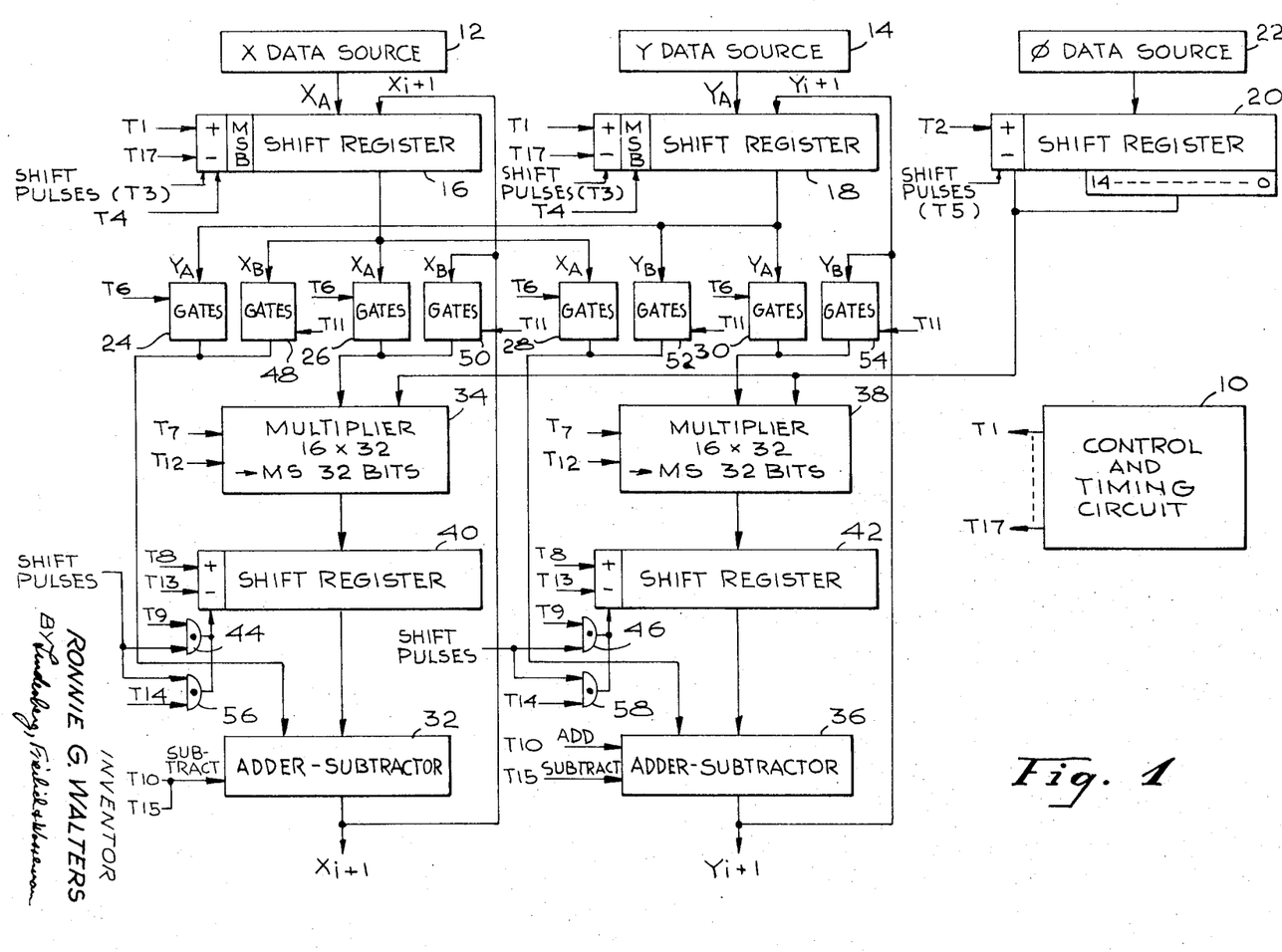
FIG. 1 is a block diagram of a sine cosine generator in accordance with this invention.

Referring now to FIG. 1 of the drawings, there may be seen a block diagram of an embodiment of the invention. The various circuits of the embodiment of the invention are operated in sequence in response to output signals from a control and timing circuit 10. This control and timing circuit may be any suitable set of counters operated in response to clock circuits which counters generate a sequence of pulses from T1 through T17.

The X and Y data for indicating the locus or the point from which the curve desired, is to be generated is provided by an X data source 12 and a Y data source 14. At time T1, two respective shift registers, 16 and 18, are enabled to accept respective data words $X_A$, bits A from the X data source and the Y data source. By way of example, these may be 32 bit words. The bit in the most significant bit position is a sign bit. The bit in the next most significant position is the most significant bit for the word. Thus, the arrangement of the registers is shown accordingly.

Figure 2:
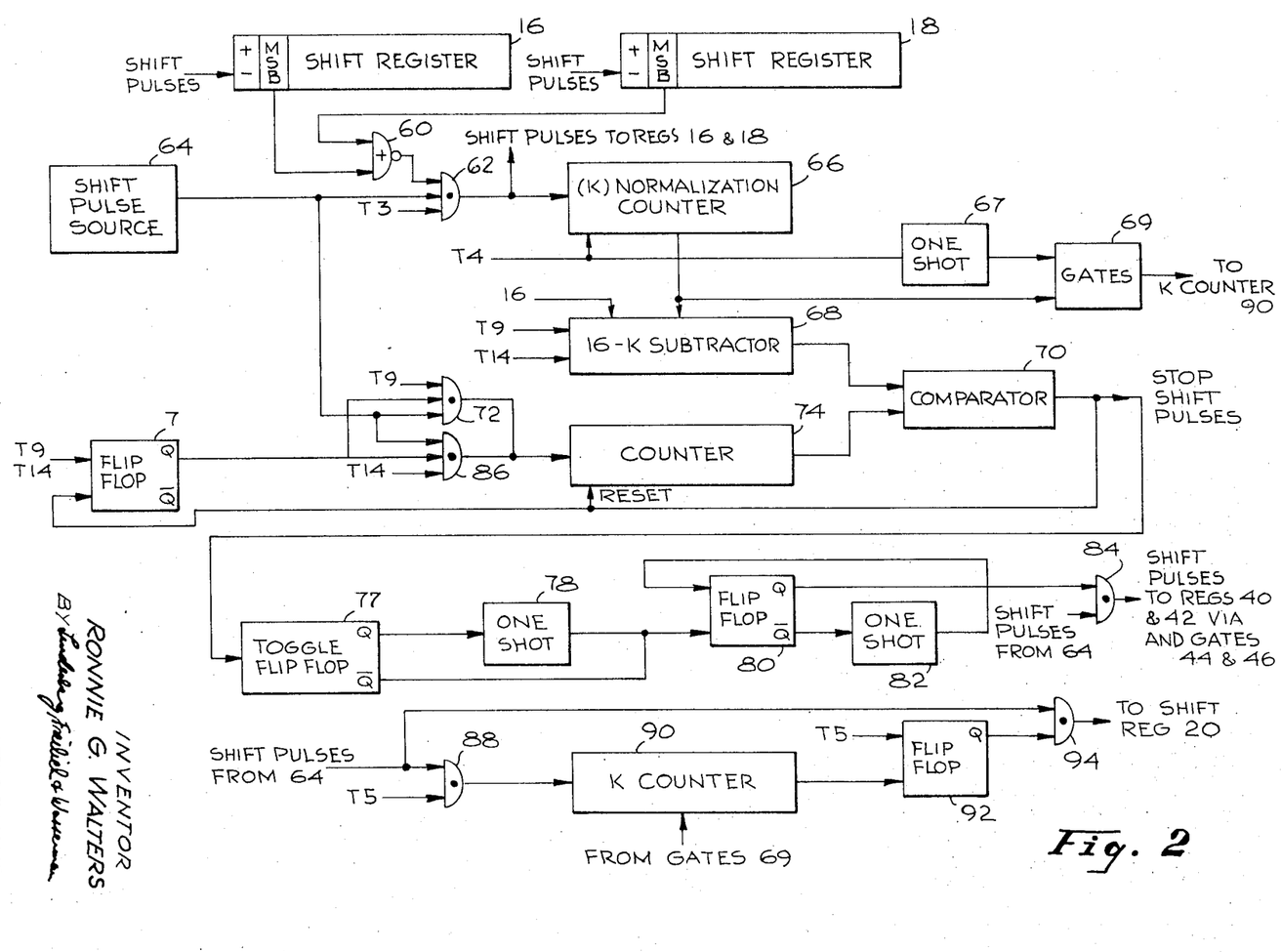
FIG. 2 is a block diagram of additional circuits required in FIG. 1.

Another 32 bit shift register 20, can accept a 32 bit data word from the $\phi$ data source 22 at time T2. The shift register 20 may be shifted to the right when required. The output of this register is the sign bit and the least significant 15 bits of the input, the least significant of which is always zero. $\phi$ is presented as $\phi' =$ RADIANS/ITERATION $\times 2^{32}$ subject to the constraint $\phi' < 2^{(32+16)}/ \sqrt{X_o^2 + Y_o^2}$ and $\phi < 1.0$ At time T3, registers 16 and 18 are caused to shift their contents left one bit at a time until a 1 appears in the 31st bit (MSB) of either of the registers. Circuitry for doing this is shown in FIG. 2. Thereafter, at the leading edge of time T4, both registers are shifted right one bit. This eliminates the possibility of overflow. As this is happening, the resultant total number of shifts is counted by the circuitry shown in FIG. 2, and is stored as a normalization constant K.

A counter 90, shown in FIG. 2, is set to indicate the count K shortly after T4 and before T5.

At time T5, in accordance with the circuitry which is shown in FIG. 2, shift pulses are fed to the shift register 20, to cause its contents to be shifted right by an amount equal to the normalization count.

The foregoing operations completes the set up phase. At this time the first iteration may begin.

At time T6, gates respectively 24, 26, 28, and 30, are enabled to transfer the numbers applied to their inputs, to their outputs. Gates 24 receives the output of shift register 18 and enters this into an adder/subtractor circuit 32. Gates 26 receives the output of shift register 16 and enter this into a multiplier circuit 34. Gates 28 receives the output of the shift register 16 and enter this into a second adder/subtractor circuit 36. Gates 30 receive the output of shift register 18 and enter this into a second multiplier circuit 38.

The multiplier circuits are 16 $\times$ 32 multipliers and produce as an output a signed 32 bit output. (most significant 32 of 48)

The second input to the two multipliers respectively 34 and 38 comprises the sign bit and the least significant 15 bits of the value $\phi$ which is in the shift register 20. At time T7, both multipliers multiply their two inputs, and at time T8, the resultant products are transferred into two shift registers respectively 40, 42, which are positioned to receive the outputs of the multipliers.

At time T9 the respective shift registers 40 and 42 are directed to shift their contents to the right by $(1 - 16 - K)$ bits. Structure for doing this is shown in FIG. 2. This will include the respective AND gates 44 and 46, respectively having their outputs connected to the shift registers 40 and 42. One input to these AND gates is the pulse signal T9. The other input comprises shift pulses in an amount $(1 - 16 - K)$ pulses.

When the shift is completed, at time T10, the adder 32 is instructed to subtract the output of the shift register which is applied as one input from the output of the gates 24 which was applied to the second input. Also at time T10 the adder/subtractor 36 is instructed to add the output of the shift register 42 to the number received from the gates 28. At this point the register of the adder/subtractor 32 contains $-2^K (\phi/2 X_i - Y_i)$ and the register of the adder/subtractor 36 contains $2^K (\phi/2 Y_i + X_i)$.

Upon the occurrence of T11, gates 48, 50, 52, and 54 are enabled. Gates 48, which are connected to the output of shift register 16 and have their outputs in turn connected to the input to the adder/subtractor 32, transfer the contents of shift register 16 into one input to the adder/subtractor. Gates 50, which are connected to the output of the adder/subtractor 32, enter its output into one input of the multiplier 34.

Gates 52, which have their inputs connected to the shift register 18 and their outputs connected to one input to the adder/subtractor 36, enter the contents of the shift register into the adder/subtractor 36. Gates 54, which have their inputs connected to the outputs of the adder/subtractor 36, enters that number in the multiplier 38.

At time T12 the respective multipliers 34 and 38 multiply their inputs which comprise the outputs of the respective adder/subtractors 32 and 36 and of the $\phi$ shift register 20.

At time T13, the outputs of the multipliers are again entered into the respective shift registers 40, 42.

At time T14, an AND gate, respectively 56 and 58, enable shift pulses to be applied to the respective shift registers 40 and 42 to enable them to shift their contents to the right by $(16 - K)$ bits.

At time T15, the respective adder/subtractor circuits 32 and 36 are instructed to add and subtract respectively their inputs comprising the outputs of the respective shift registers 40 and 42, to/from their other inputs, which are the present contents of the shift registers 16 and 18. At this time the output of the adder/subtractor circuit 32 will be $2^K(X_i - \phi(\phi/2X_i - Y_i))$ and the output of the adder/subtractor circut 36 will be $2^K(Y_i - \phi(\phi/2Y_i + X_i))$.

At time T17, the shift registers respectively 16 and 18, are loaded with the outputs of the adder/subtractors, which respectively equal $X_{i+1}$ and $Y_{i+1}$, and registers 40 and 42 contain the corresponding increments, all of which are scaled by $2^K$. At this point for the next iteration, the control and timing circuits repeat the timing outputs T6 through T17 since the system is already loaded. This will result in producing $X_{i+2}$ and $Y_{i+2}$ This timing sequence T6 through T17 is repeated for as many iterations as are required to obtain a curve having the desired number of radians. At this time it is stopped.

The word length and scaling indicated above are exemplary only and are not intended to be limiting as to the scope of the invention.

Referring now to FIG. 2, there may be seen circuitry for effectuating the normalization of the contents of registers 16 and 18. The most significant bit positions of the respective shift registers are connected to the inputs to a NOR gate 60, the output of which is applied to an AND gate 62. Two other required inputs to this AND gate are pulses from a shift pulse source 64, and a T3 signal from the control and timing circuit 10. In the presence of these, the AND gate 62 permits shift pulses to be applied to a normalization counter 66 and to registers 16 and 18. This counter counts the number of shift pulses which are then being applied to the respective shift registers 16 and 18. Upon the occurrence of the 1 in the most significant bit position of either of the registers, the NOR gate 60 output goes low and AND gate 62 is closed thus no longer passing shift pulses. Normalization counter 66 has therefore counted the number of shift pulses entered into the shift register. At time T4 the count of this counter is decremented by one, thereby leaving the counter with the value of the normalization constant K.

The counter output of the normalization counter is applied to a subtractor circuit 68, which has as its second input the binary value equal to 16. At time T9, the subtractor is enabled and produces an output 16—K which is applied to a comparator 70. At time T9 a flip-flop 76 is set and an AND gate 72 is enabled by these outputs whereby shift pulses from the source 64 may be applied to a counter 74. The count output of the counter is applied to the comparator 70 to be compared with the result of the 16—K subtraction. When the two are equal, the comparator produces an output signal which resets the counter and resets flip-flop 76 whereby AND gate 72 is no longer enabled to pass shift pulses to the counter.

The output of the comparator 70 is also applied to a toggle flip-flop 77, driving it to its Q state whereby it energizes a one-shot circuit 78. The one shot has a delay interval equal to the interval between two shift pulses. Its output drives a flip-flop 80 to its $\overline{Q}$ state threeby driving another one shot 82. The output of the one shot 82 resets the flip-flop 80. The Q output of flip-flop 80 is applied to an AND gate 84. The other input to the AND gate 84 comprise shift pulses from the source 64.

To understand how the circuit described works to produce $1 + 16 - K$ shift pulses to the registers 40 and 42, it should be appreciated that upon the occurrence of a T9 signal, AND gates 44 and 46 start applying shift pulses to registers 40 and 42, which are received from AND gate 84. When comparator 70 indicates that 16—K shift pulses have been applied, its output causes the toggle flip-flop 76 to drive the one shot 78 which provides a delay sufficient to enable one more shift pulse to be applied to the shift registers. At this time, flip-flop 80 is reset whereby AND gate 84, which provides the shift pulses to the registers 40 and 42, is closed. One shot 82 provides a time interval sufficient to insure that the T9 pulse terminates, at which time flip-flop 80 is set thereby enabling AND gate 84 to pass shift pulses again.

At time T14 it is necessary to shift the contents of registers 40 and 42 to the right 16—K shift pulses. At T14 time, an AND gate 86 is enabled by the Q output of flip-flop 76, to pass shift pulses to the counter 74. Upon the comparator 70 providing an output, the toggle flip-flop is driven to its $\overline{Q}$ state. The $\overline{Q}$ output of the toggle flip-flop bypasses the one shot 78 and resets flip-flop 80 to turn off the application of shift pulses to registers 40 and 42. Thus only 16—K shift pulses have been applied to registers 40 and 42.

The manner in which shift register 20 is shifted to the right K pulses is also shown in FIG. 2. At time T4 a one shot 67 is driven, in response thereto, to enable gate 69 to transfer the count K into a down counter 90. This transfer occurs before T5. Shift pulses from souce 64 are applied to a NAND gate 88. This NAND gate is enabled, in the presence of a T5 pulse, to apply the shift pulses to the down counter 90. The presence of the T5 pulse also sets a flip-flop 92. The Q output of the flip-flop 92 enables an AND gate 94. The other input to the AND gate is shift pulses from the source 64. The output of the AND gate is applied to the shift register 20 causing it to shift to the right. When the K count counter has counted to (0), it resets the flip-flop 82 whereby the NAND gate 94 is no longer enabled to transfer shift pulses to the shift register 24.

It should be appreciated that if the direction of rotation is desired to be changed, all that is necessary is to change the sign of $\phi$. The outputs $X_{i+1}$ and $Y_i + 1$ indicate the loci of the points on the desired curve.

Figure 3:
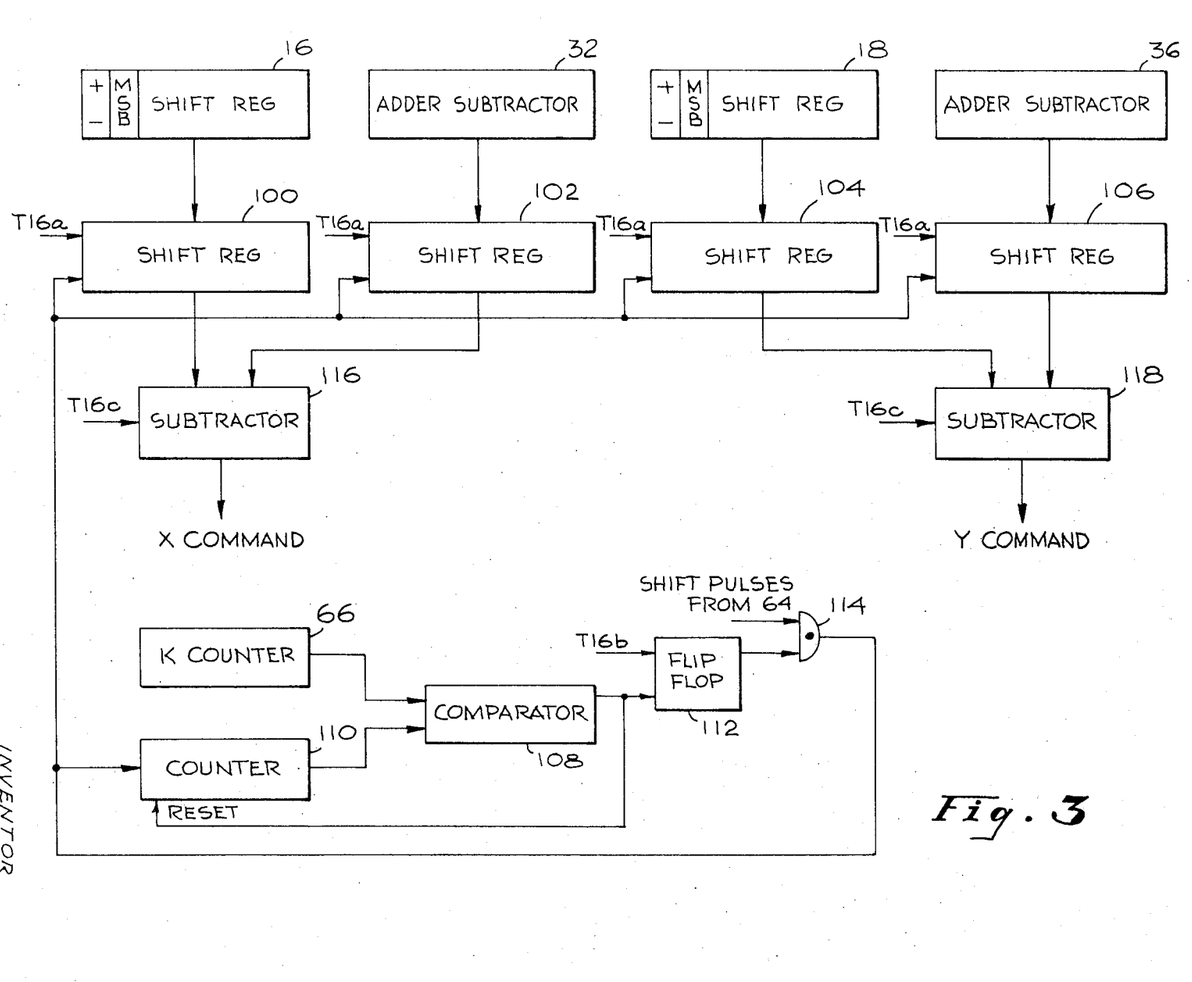
FIG. 3 is a block diagram illustrating how the embodiment of the invention may be employed in a numerical control system for a machine tool.

In order to adapt the embodiment of the invention for utilization to a numerical machine tool control system, the arrangement shown in FIG. 3 may be employed. For this arrangement there are provided shift registers and subtractors for making a transition from the high precision data generated by the sine-cosine generator to lower precision data required by the position servos of a numerical machine tool control system. This is done in such a manner as to yield incremental outputs to the servos which, when added up, are equal to the rounded off $X_{i+1}$ and $Y_{i+1}$.

For numerical machine tool control in a circular mode, the inputs to the respective shift registers, 16 and 18 are the I and J values which are initially in the same precision as in the servo loop. These are the values provided in systems to indicate the radius of the curve desired. The input $\phi$ is simply the feedrate number multiplied by a constant. That is, the feedrate number is generally given in the units (radians per minute). This is just scaled to radians per iteration and thus is a function of ($\Delta t$). Note also that ($\Delta t$) is generally fixed in an application such as this, particularly when the system is implemented on a computer.

The numerical machine tool with which this invention is employed is operated until its cutting tool is brought to the location of the work piece at which the curve is desired to be cut. Then, upon decoding of the code word usually employed in these systems which indicate that a curve is desired to be cut, the shift registers 16, 18 and 20 are loaded with the respective I, J, and $\phi$ data and the control timing circuit 10 is energized. The circuit arrangement shown in FIG. 1 operates in the manner described until time T16. Time T16 is a delay time and is broken into three intervals. At time T16a, a shift register 100 is enabled to receive the contents of shift register 16. A shift register 102 is enabled to receive the contents of the adder/subtractor 32. A shift register 104 is enabled to receive the contents of the shift register 18. A shift register 106 is enabled to receive the contents of the adder/subtractor 36. The contents of the adder subtractors respectively are $X_{i+1}$ and $Y_{i+1}$, (or $I_{i+1}$ and $J_{i+1}$). The contents of the respective shift registers 16 and 18 are $I_i$ and $J_i$.

At a time T16b, the contents of the respective shift registers 100, 102, 104 and 106 are shifted K bits to the right. This is achieved by comparing the contents of the K or normalization counter 66 with the contents of a counter 110, which is allowed to count until such time as a comparator 108 indicates that the contents of the counter 110 equals the contents of the K counter 66. At this time the comparator output resets the counter and resets a flip-flop 112. The flip-flop 112 was set upon occurrence of the T16b pulse, whereby it enabled an AND gate 114 to apply shift pulses, not only to the counter 110 but also to the shift registers 100, 102, 104 and 106. When counter 110 has a count equal to that of the normalization, the supply of the shift pulses is terminated. Thus these registers have been shifted K bits to the right to compensate for the K or normalization multiplier previously applied to the contents of shift registers 16 and 18 and adder subtractors 34, 38.

Upon the occurrence of the time T16c, two subtractors respectively 116 and 118, are respectively enabled to subtract the contents of the shift register 100 from the contents of the shift register 102, and the contents of the shift register 104 from the contents of the shift register 106. The outputs of the subtractors constitute the incremental outputs which are applied to the positioning servo motors in well known manner to cause them to move whereby the machine tool describes an arc. Separate end points are normally provided which can be K normalized and compared with the contents of shift registers 16 and 18 to indicate when the arc cutting operation is finished.

There has accordingly been shown and described herein a novel and useful sine-cosine generator or curve generator. An idea of the improvement in accuracy of this invention over conventional DDA system may be gained from the following table which shows the truncation error after one radian for both systems.

COMPARISON OF TRUNCATION ERROR

| Radius $\sqrt{X^2+Y^2}$ | $10^7$ | $10^6$ | $10^5$ | $10^4$ | |
|---|---|---|---|---|---|
| Radian/Iter, $\phi$ | $15\times10^{-6}$ | $15\times10^{-5}$ | $15\times10^{-4}$ | $15\times10^{-3}$ | |
| Conventional DDA. (Parallel)[1] | 75. | 75. | 75. | 75. | Error after 1 radian. |
| System of Fig. 1 [2] | $.42\times10^{-8}$ | $.42\times10^{-6}$ | $.42\times10^{-4}$ | $.42\times10^{-2}$ | |

[1] A conventional (parallel method) DDA with normalization.
[2] Note that some errors are less than system resolution (with normalization).

What is claimed is:

1. A system for iteratively producing points which lie on a desired circle having a radius determined by initial conditions including the $x$ and $y$ position coordinates of a starting point of said circle and the desired radians/iteration represented as $\phi$, said system comprising:
   first means for storing the value of $x$,
   second means for storing the value of $y$,
   third means for storing the value of $\phi$,
   first means for multiplying to which the contents of said first means for storing and said third means for storing are applied to produce a first product,
   second means for multiplying to which the contents of said second means for storing and said third means for storing are applied, to produce a second product,
   fourth means for storing the first product produced by said first means for multiplying,
   fifth means for storing the second product produced by said second means for multiplying,
   a first adder/subtractor to which the contents of said fourth means for storing and the contents of said second means for storing are applied to be subtracted to produce a difference value,
   a second adder/subtractor to which the contents of said fifth means for storing and the contents of said first means for storing are applied to be added to produce a sum value,
   means for applying the value in said third means for storing and the value in said first adder/subtractor means to said first means for multiplying to produce a third product value,
   means for applying the value in said third means for storing and the value in said second adder/subtractor means to said second means for multiplying to produce a fourth product value,
   means for transferring said third product in said first means for multiplying into said fourth means for storing,
   means for transferring said fourth product value in said second means for multiplying into said fifth means for storing,
   means for applying the third product value in said fourth means for storing and the value in said first means for storing to said first adder/subtractor to be added to produce a value which is the $x$ coordinate of the next point on the perimeter of said desired circle,
   means for applying the value in said second means for storing and the value in said fifth means for storing to said second adder/subtractor to be subtracted to produce a value which is the $y$ coordinate of the next point on the perimeter of said desired circle, and
   means for entering the $x$ and $y$ coordinate values generated by said first and second adder/subtractor respectively into said first and second means for storing for determining the locus of the next point on the perimeter of said desired circle.

2. A system as recited in claim 1 wherein said first through said fifth means for storing all comprise shift registers,
   first and second ones of said shift registers which are said first and second means for storing each includes means for shifting the values $x$ and $y$ in said first and second shift registers in one direction a number of digit positions required to normalize said values, less one digit position to produce a value K,
   a third of said shift registers which is said third means for storing includes means for shifting said value $\phi$ in said third shift register a number of digit positions equal to K in a direction opposite to said one direction,
   a fourth and fifth ones of said shift registers which are said fourth and fifth means for storing includes means for shifting the respective first and second product values $\phi x$ and $\phi y$ in said fourth and fifth shift registers in a direction opposite to said one direction a number of digit positions equal to $(1 + 16K)$, and means for shifting the respective third and fourth product values in said fourth and fifth shift registers in a direction opposite to said one direction a number of digit positions equal to $(16 - K)$.

3. A system as recited in claim 1 wherein said first and second means for multiplying include means for producing as their products only a predetermined number of the most significant bits in their products.

4. A system as recited in claim 1 wherein there is included means for subtracting the respective $x$ and $y$ values in said first and second means for storing from the respective $x$ and $y$ coordinate values generated by said first and second adder/subtractors to provide values representative of motion increments for describing a circle.

5. The method for iteratively producing points which lie on the periphery of a circle from initial condition information comrising the $x$ and $y$ coordinates of the start of the desired circle and a value $\phi'$ which equals radians per iteration $(\phi) \times 2^{32}$ where $\phi < 1.0$, said method comprising storing the values of $x$, $y$ and $\phi'$ respectively in first, second and third storage means, multiplying the values in said first and third storage registers to produce a first product, multiplying the values in said second and third storage means to produce a second product, storage said first and second products respectively in a fourth and fifth storage means, subtracting the product in said fourth storage means from the value in said second storage register to produce a first difference, adding the value in said first storage means to the product in said fifth storage means to produce a first sum, multiplying said first difference by the value in said third storage means to produce a third product, multiplying said first sum by the value in said third means to produce a fourth product, storing the third and fourth products respectively in said fourth and fifth storage means, adding the values in said first register to the third product in said fourth storage means to produce the $x$ coordinate of the next point on the circle, subtracting from the value in said second storage means the product in said fifth storage means to produce the $y$ coordinate of the next point on the circle, and storing the respective values of the $x$ and $y$ coordinates of the next point on the circle respectively in the first and second storage means for the next iteration.

6. The method recited in claim 5 wherein the step of storing the values of $x$, $y$ and $\phi'$ in said first, second and third storage means further includes the steps of normalizing the $x$ and $y$ values in said first and second storage means whereby the values of $x$ and $y$ are multiplied by $2^N$, where N is a normalization value, reducing the normalization of the $x$ and $y$ values in said first and second storage means by one digit position to reduce their multiplication to a value $2^{N-1}$ equal to $2^K$, multiplying the value $\phi$ in the third storage means by $2^{-K}$;

said step of storing said first and second products in a fourth and fifth storage means further includes multiplying the respective first and second products in said fourth and fifth storage means $2^{-(1+-K)}$, and multiplying the third and fourth products in said fourth and fifth storage means by $2^{-(16-K)}$.

7. The method as recited in claim 6 wherein there is included the steps of storing the values of $x$, $y$, and the $x$ and $y$ coordinates of the next point on the circle respectively in sixth, seventh, eighth and ninth storage means, multiply the values in each of said sixth, seventh, eighth and ninth storage means by $2^{-K}$, subtracting the values in said sixth and said seventh shift registers from one another to produce circular motion command increments, and subtracting the values in said seventh and ninth shift registers from one another to produce circular motion command increments.

8. The method as recited in claim 5 wherein each of steps of multiplying includes omitting a predetermined number of least significant bits in the product.

* * * * *

UNITED STATES PATENT OFFICE
CERTIFICATE OF CORRECTION

Patent No. 3,728,528  Dated April 17, 1973

Inventor(s) Ronnie G. Walters

It is certified that error appears in the above-identified patent and that said Letters Patent are hereby corrected as shown below:

Column 1, Line 32    "2." should read --(2)--

Column 1, Line 52    "4." should read --(4)--
Column 1, Line 54    "5." should read --(5)--
Column 1, Line 67    "6." should read --(6)--

Column 2, Line 4     "7." should read --(7)--

Column 2, Line 5     "8." should read --(8)--

Column 3, Line 1     "exactly" should read --exactly--
Column 3, Line 13    "10." should read --(10)--
Column 3, Line 34    "12." should read --(12)--

Column 3, Lines 35 and 36    "$(1-\phi^2)^{1/2} = 1-1/2\phi^2 -1/8\phi^4 -1/16\phi^6 136 - 5/128\phi^8...$" should read --$(1-\phi^2)^{1/2} = 1-1/2\phi^2-1/8\phi^4-1/16\phi^6-5/128\phi^8...$--

Column 3, Line 43    "or more" should read --or more--

Column 3, Line 49    "13." should read --(13)--

Column 3, Lines 49 and 50    "$X_{i+1} = X_i - 2^{-(2N+1)}X_i\ 31\ 2^{-(4N+3)}X_i - 2^{-(6N+4)}X_i + 2^{-N}Y_i$" should read --$X_{i+1} = X_i - 2^{-(2N+1)}X_i - 2^{-(4N+3)}X_i - 2^{-(6N+4)}X_i + 2^{-N}Y_i$--

Column 3, Lines 51 and 52    "$Y_{i+1} = Y_i - 2^{-(2N+1)}Y_i - 2^{-(4N+3)}Y_i - 2^{-(6N+4)}Y_i - 2\ 116\ NX_i$" should read --$Y_{i+1} = Y_i - 2^{-(2N+1)}Y_i - 2^{-(4N+3)}Y_i - 2^{-(6N+4)}Y_i - 2^{-N}X_i$--

UNITED STATES PATENT OFFICE
CERTIFICATE OF CORRECTION

PAGE 2

Patent No. 3,728,528     Dated April 17, 1973

Inventor(s) Ronnie G. Walters

It is certified that error appears in the above-identified patent and that said Letters Patent are hereby corrected as shown below:

| Location | Correction |
|---|---|
| Column 3, Line 55 | "14." should read --(14)-- |
| Column 4, Line 30 | "15." should read --(15)-- |
| Column 4, Line 34 | Insert --for $(\phi)$-- after "$(\omega)$" |
| Column 4, Line 35 | "16." should read --(16)-- |
| Column 4, Line 37 | "17." should read --(17)-- |
| Column 4, Line 43 | "$X_{i-1} = X_i - \phi(1/2\phi X_i - Y_i)$" should read --$X_{i+1} = X_i - \phi(1/2\phi X_i - Y_i)$-- |
| Column 4, Line 45 | "18." should read --(18)-- |
| Column 5, Lines 2 and 3 | "bits A" should read --$Y_A$-- |
| Column 5, Lines 61 and 62 | "(1-16-K)" should read --(1+16-K)-- |
| Column 5, Line 67 | "(1-16-K)" should read --(1+16-K)-- |
| Column 7, Line 20 | "counter" first occurrence should read -- count |
| Column 7, Line 40 | "threeby" should read --thereby-- |
| Column 8, Line 24 | "$Y_i+1$" should read --$X_i+1$-- |
| Column 9, Line 32 | K should read --"K"-- |
| Column 11, Line 4 | "(1+16K)" should read --(1+16-K)-- |
| Column 11, Line 22 | "comrising" should read --comprising-- |

FORM PO-1050 (5/69)

UNITED STATES PATENT OFFICE
CERTIFICATE OF CORRECTION

PAGE 3

Patent No. 3,728,528  Dated April 17, 1973

Inventor(s) Ronnie G. Walters

It is certified that error appears in the above-identified patent and that said Letters Patent are hereby corrected as shown below:

Column 12, Line 27  Insert --by-- after "means"

Column 12, Line 28  "$2^{-(1+-K)}$" should read --$2^{-(1+16-K)}$--

Signed and sealed this 2nd day of April 1974.

(SEAL)
Attest:

EDWARD M. FLETCHER, JR.
Attesting Officer

C. MARSHALL DANN
Commissioner of Patents